Figure 1:
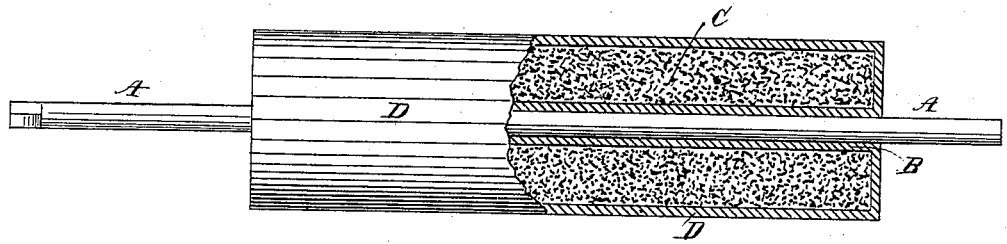

(No Model.)

L. S. HOYT.
RUBBER COVERED COMPOUND.

No. 322,936. Patented July 28, 1885.

Witnesses
Wm. H. Miller
J. M. Culver

Inventor
Lewis S. Hoyt

UNITED STATES PATENT OFFICE.

LEWIS S. HOYT, OF BOSTON, MASSACHUSETTS, ASSIGNOR OF ONE-HALF TO JOHN M. CULVER, OF SAME PLACE.

RUBBER-COVERED COMPOUND.

SPECIFICATION forming part of Letters Patent No. 322,936, dated July 28, 1885.

Application filed April 16, 1885. (No specimens.)

*To all whom it may concern:*

Be it known that I, LEWIS STEBBENS HOYT, a citizen of the United States, residing at Boston, in the county of Suffolk and State of Massachusetts, have invented certain improvements in the combination of virgin caoutchouc and sulphur with a laminated or composite material composed of granulated cork bark, rubber, and sulphur, of which the following is a specification.

My improved invention has especial reference to Letters Patent numbered 311,834, issued February 3, 1885, with the essential difference that in the present application the novelty of my improvement consists in an original method of applying sheets of caoutchouc over a prepared filling of granulated cork bark and rubber particles, or forming an interior and exterior of said caoutchouc with an intermediate body of said composite material, which becomes homogeneously united through vulcanization. This product embodies elasticity, durability, and lightness, while inexpensive.

To achieve this result I proceed as hereinafter described. The elementary and uncompounded parts of said body or filling consists of granulated cork bark, pure caoutchouc, and sulphur commingled in desirable proportions, and may be produced in flat webs of convenient length and breadth by passing thin sheets of caoutchouc through cylindrical kneading-rolls heated to a proper degree. When a sufficient temperature is imparted to said caoutchouc, the granulated cork is distributed evenly and sufficiently plentiful to cover the tepid rubber, which has become adhesive, and the particles of cork are held until the succeeding surfaces of the gum are brought into contact by the continued rotation of said heated kneading-cylinders. By this method the continued manipulation of said material produces a laminated composite product, which, after becoming of sufficient thickness, is transferred to the cutting-tables subject to the various and manifold uses to which it is adapted; or I may produce the body or filling by preparing granulated cork with particles of caoutchouc thoroughly and intimately commingled through being subjected to friction or kneading until the whole product forms a homogeneous mass, which may then be pressed into sheets preparatory to the various uses required commercially. I do not, however, confine myself to nor distinctly claim the product produced in the laminated form—by commingling or mixture—by dissolving, macerating, or any of the practiced methods, as above indicated, all of which are well known or used.

In the practical application of my alleged invention, I select, for the purpose of my illustration, three articles of manufacture which embody my improvement—a clothes-wringing-machine roll, a foot or floor mat, and a section of a tire for bicycle-wheels. In the former instance I prepare a hollow central core or bearing of such thickness as the exigencies of the construction may require, which will receive the metal shaft or bearing. Around and upon this core is wound compactly by successive movements said prepared filling in desired quantity until sufficient body is produced. I now secure the outer and final envelope of caoutchouc either in thin consecutive layers or in one sheet of desirable thickness. The roll is now exposed to heat and vulcanized until the outer mass and said interior filling and central core become intimately commingled and form a homogeneous product, combining density and lightness.

In the second form of construction a sheet of caoutchouc for the exterior covering united to one body of filling is required, the manipulation occurring as aforesaid.

In the third form of construction the composite interior body or filling is placed next to the periphery of the metal wheel—when in position—the exterior circumference or dense portion of the tire being outwardly the wearing-surface, and manipulated as above.

Figure 2:
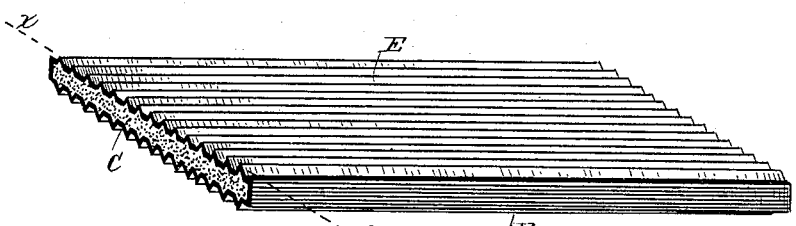
Figure 3:
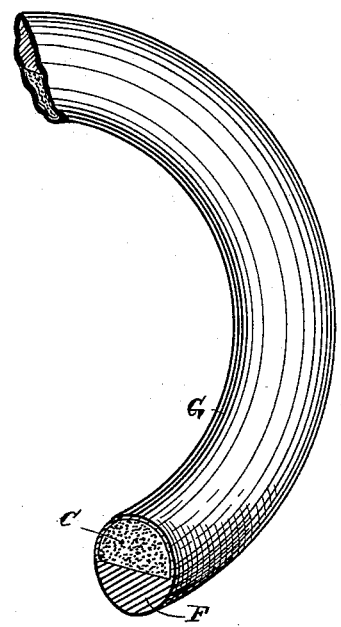

The construction of my improved product will be further seen by referring to the drawings forming a part of this specification, wherein Figure 1 illustrates a clothes-wringing-machine roll—in elevation and half-section—with the metal shaft thereto attached. Fig. 2 exhibits a floor-mat in perspective, with a portion of one end sundered to render its construction perceptible. Fig. 3 indicates in transverse section the segment of a bicycle-wheel tire.

Referring to the letters, A, Fig. 1, indicates the metal shaft or bearing; B, the interior surrounding envelope of caoutchouc securely embracing said shaft. C is the composite material compounded of cork bark and caoutchouc granules, and D represents the exterior enwrapping, also of caoutchouc.

C, Fig. 2, is the composite filling aforesaid, (shown below dotted line $xx$,) while E E represent the wearing-surfaces molded in ridges to enhance its usefulness for the purpose intended.

C, Fig. 3, is the composite filling. F is the wearing-surface. G is the exterior enwrapping of caoutchouc inclosing the composite body.

The references to sulphur throughout the described manipulation of the caoutchouc and composite material is omitted to avoid reiteration. Obviously "vulcanization" signifies the use of this mineral, which I do employ in the various proportions, such as the necessities of my manufacture may require.

It will be obvious that my improved combination is applicable to innumerable forms of construction.

Having now particularly described and ascertained the nature of my invention, and in what manner the same is to be performed, I declare that what I claim is—

1. A composite material of granulated cork bark with rubber particles, in combination with an exterior surface of virgin caoutchouc, the mass to be vulcanized under pressure, so as to unite inseparably the exterior and interior products to form one homogeneous elastic or non-elastic compound, substantially as and for the purpose specified.

2. In manufactured articles, the combination of virgin caoutchouc and an added desirable proportion of sulphur with and enwrapping a laminated or composite material of granulated cork and rubber and sulphur homogeneously united, in the manner and for the purpose set forth.

LEWIS S. HOYT.

Witnesses:
WILLIAM W. BENNETT,
J. M. CULVER.